(12) United States Patent
Otten et al.

(10) Patent No.: US 11,319,924 B2
(45) Date of Patent: May 3, 2022

(54) WIND TURBINE WITH ROTOR LOCKING SYSTEM

(71) Applicant: Vestas Wind Systems A/S, Aarhus N. (DK)

(72) Inventors: Jeppe Hesseldal Otten, Åbyhøj (DK); Thomas Møller Christiansen, Hjortshøj (DK); Erik Markussen, Videbæk (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/284,036

(22) PCT Filed: Oct. 9, 2019

(86) PCT No.: PCT/DK2019/050298
§ 371 (c)(1),
(2) Date: Apr. 9, 2021

(87) PCT Pub. No.: WO2020/088722
PCT Pub. Date: May 7, 2020

(65) Prior Publication Data
US 2021/0396210 A1 Dec. 23, 2021

(30) Foreign Application Priority Data
Nov. 1, 2018 (DK) .......................... PA 2018 70712

(51) Int. Cl.
*F03D 80/50* (2016.01)
*F03D 7/02* (2006.01)
*F03D 1/06* (2006.01)

(52) U.S. Cl.
CPC ........... *F03D 7/0268* (2013.01); *F03D 1/065* (2013.01); *F05B 2240/60* (2013.01); *F05B 2260/31* (2020.08)

(58) Field of Classification Search
CPC .................. F03D 80/50; F05B 2260/30; F05B 2260/301; F05B 2260/602
See application file for complete search history.

(56) References Cited

U.S. PATENT DOCUMENTS 8,334,608 B2 * 12/2012 Pechlivanoglou ...... F03D 13/20
290/55
8,556,591 B2 * 10/2013 Koronkiewicz ........ F03D 80/00
416/244 R (Continued)

FOREIGN PATENT DOCUMENTS

CN 205638800 U 10/2016
EP 2381092 A2 10/2011

(Continued)

OTHER PUBLICATIONS

Danish Patent and Trademark Office, Search and Examination Report in PA 2018 70712, dated Apr. 3, 2019.

(Continued)

*Primary Examiner* — David E Sosnowski
*Assistant Examiner* — Maxime M Adjagbe
(74) *Attorney, Agent, or Firm* — Wood Herron & Evans LLP

(57) ABSTRACT

A wind turbine (10) includes a main shaft (34) including a front end (34a), the front end (34a) including a first connecting structure (36). A rotor hub (22) includes a second connecting structure (40), wherein the second connecting structure (40) of the rotor hub (22) is fixed to the first connecting structure (36) of the main shaft (34). A plurality of blades (24) is coupled to the rotor hub (22). A rotor locking disc (32) is carried on the main shaft (34), the rotor locking disc (32) having an outer circumference (32a) and a plurality of recesses (50) on the outer circumference (32a), the recesses (50) having openings (50a) intersecting with the outer circumference (32a). At least one rotor locking pin (Continued)

(30) is movable between a disengaged position relative to at least one of the recesses (50) and an engaged position wherein the pin is located at least partially in one of the recesses (50) for locking the rotor hub (22) against rotation.

14 Claims, 6 Drawing Sheets

(56) References Cited

U.S. PATENT DOCUMENTS

| | | | |
|---|---|---|---|
| 8,646,177 B2* | 2/2014 | Tirumalai | F03D 13/10 |
| | | | 29/889.21 |
| 2006/0196288 A1 | 9/2006 | Aust et al. | |
| 2010/0232978 A1* | 9/2010 | Nielsen | F03D 80/50 |
| | | | 416/248 |
| 2011/0309631 A1 | 12/2011 | Rebsdorf | |

FOREIGN PATENT DOCUMENTS

| | | |
|---|---|---|
| ES | 2369810 A1 | 12/2011 |
| KR | 20140072561 A | 6/2014 |
| WO | 2017211366 A1 | 12/2017 |
| WO | 2018065018 A1 | 4/2018 |
| WO | 2018072796 A1 | 4/2018 |

OTHER PUBLICATIONS

European Patent Office, International Search Report and Written Opinion in PCT Application No. PCT/DK2019/050298, dated Dec. 4, 2019.

* cited by examiner

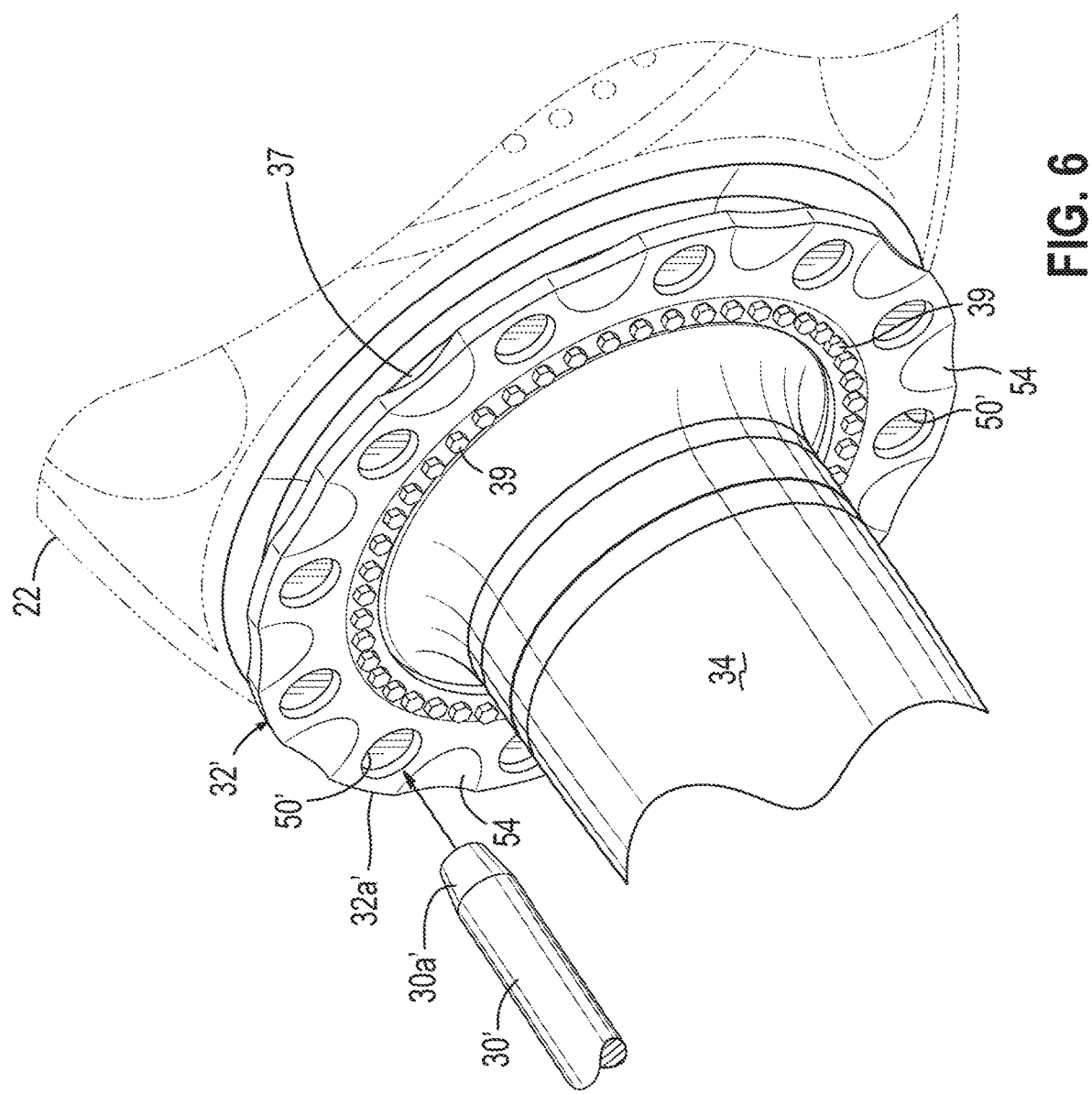

WIND TURBINE WITH ROTOR LOCKING SYSTEM

TECHNICAL FIELD

The present invention relates to wind turbines generally including a tower and one or more nacelles mounted on the tower. The nacelle houses power train components coupled with a rotor. The invention more specifically relates to methods and apparatus for locking the rotor against rotation.

BACKGROUND

It is sometimes necessary to lock the rotor of a wind turbine against rotation when the wind turbine is not in use, such as during maintenance or at other down times. For this purpose, wind turbines have included rotor braking and locking systems. The braking system is designed to stop the rotor after the rotor has been slowed almost to a stop by the pitch of the blades. The locking system then locks the rotor against any rotation. Locking systems typically utilize locking members, such as pins, that move between locking and unlocking positions in either an axial or a radial direction relative to the direction of rotation of the rotor. The axial direction is parallel to the lengthwise axis of the wind turbine main shaft, while the radial direction is perpendicular to the lengthwise axis of the main shaft. The pin is moved into and out of engagement with a rotatable ring-like structure that is fixed for rotation with both the main shaft and the rotor hub. The present invention relates to those systems using one or more pins moving axially or parallel to the main shaft and the axis of rotation of the rotor rather than moving radially or perpendicular to the main shaft and axis of rotation. The components of rotor lock systems are usually large cast parts formed in one large piece. The main component is often a cast locking ring having a plurality of closed perimeter recesses that selectively receive rotor locking pins. The recesses may be blind bores or through bores. The locking ring is fixed generally at a location between the main shaft and the rotor hub and rotates with the rotor hub and the main shaft when the wind turbine is in operation. When it is desired to lock the rotor hub against rotation, one or more pins are moved into one or more of the respective recesses. The extended pin or pins prevent the locking ring and, therefore both the rotor hub and main shaft from rotating.

Because the current locking rings utilize closed perimeter recesses located around the outer peripheral area of the ring and include ring material radially outside of the closed perimeter recesses, these conventional locking rings have large diameters which limit access by maintenance and technical personnel to the rotor hub. Also, such designs for the locking rings add to the weight of these already large scale components, and limit mechanical design freedom.

It would be desirable to provide apparatus and methods for rotor lock systems which increase accessibility to the rotor hub during maintenance or inspection activity, and which result in weight savings and increased design freedom, modular abilities and optimization of strength characteristics.

SUMMARY

The present invention generally provides a wind turbine comprising a main shaft, a rotor hub, a plurality of blades, a rotor locking disc and at least one rotor locking pin. The main shaft includes a front end, and the front end includes a first connecting structure. The rotor hub includes a second connecting structure. The first connecting structure of the main shaft is fixed to the second connecting structure of the rotor hub such that the main shaft and rotor hub rotate together. The blades are coupled to the rotor hub. The rotor locking disc is carried on the main shaft and has an outer circumference. Open perimeter recesses are located on the outer circumference of the rotor locking disc, and the open perimeter recesses have respective openings intersecting with the outer circumference of the locking disc. At least one rotor locking pin is movable in an axial direction relative to the lengthwise axis of the main shaft between a disengaged position relative to at least one of the recesses and an engaged position wherein the pin is located at least partially in one of the recesses for locking the rotor hub against rotation.

The wind turbine may further include other alternative and/or additional features or components. For example, the plurality of recesses may further comprise from six to twenty recesses. Each of the plurality of recesses may be partially circular in shape. The partially circular shaped recesses may be each defined by an arc length of at least 200 degrees. Each of the recesses and the rotor locking pin may have complementary tapered shapes, such as at least partially conical shapes. The rotor locking disc may be carried proximate the front end of the main shaft by being integrated with an area proximate the front end of the main shaft, such as by casting or other manufacturing methods. Alternatively, the rotor locking disc may be comprised of at least one component separate from the main shaft proximate or near the front end of the main shaft and affixed proximate the front end with a plurality of fasteners. The rotor locking disc may further include a plurality of fastener holes for receiving the plurality of fasteners, wherein the plurality of fastener holes are located radially inward from the plurality of circumferential recesses. The rotor locking disc may further comprise one or more reduced thickness areas respectively located generally at a peripheral region of the disc. For example, one or more reduced thickness areas may be located between adjacent recesses. Each of the reduced thickness areas may be generally U-shaped. Each of the plurality of recesses may be generally U-shaped.

In another general aspect, the invention provides a wind turbine comprising a main shaft with a front end. The front end includes a first connecting structure. A rotor hub includes a second connecting structure, and the second connecting structure of the rotor hub is fixed to the first connecting structure of the main shaft. A plurality of blades is coupled to the rotor hub. A rotor locking disc is carried on the main shaft and has a plurality of recesses. At least one rotor locking pin is movable in an axial direction relative to the lengthwise axis of the main shaft between a disengaged position relative to at least one of the recesses and an engaged position wherein the pin is located at least partially in one of the recesses for locking the rotor hub against rotation. A plurality of reduced thickness areas are located at a peripheral region of the disc in areas between adjacent recesses.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 6 is a schematic perspective view illustrating an alternative embodiment including complementary pins and closed perimeter recesses.

DETAILED DESCRIPTION

Figure 1:
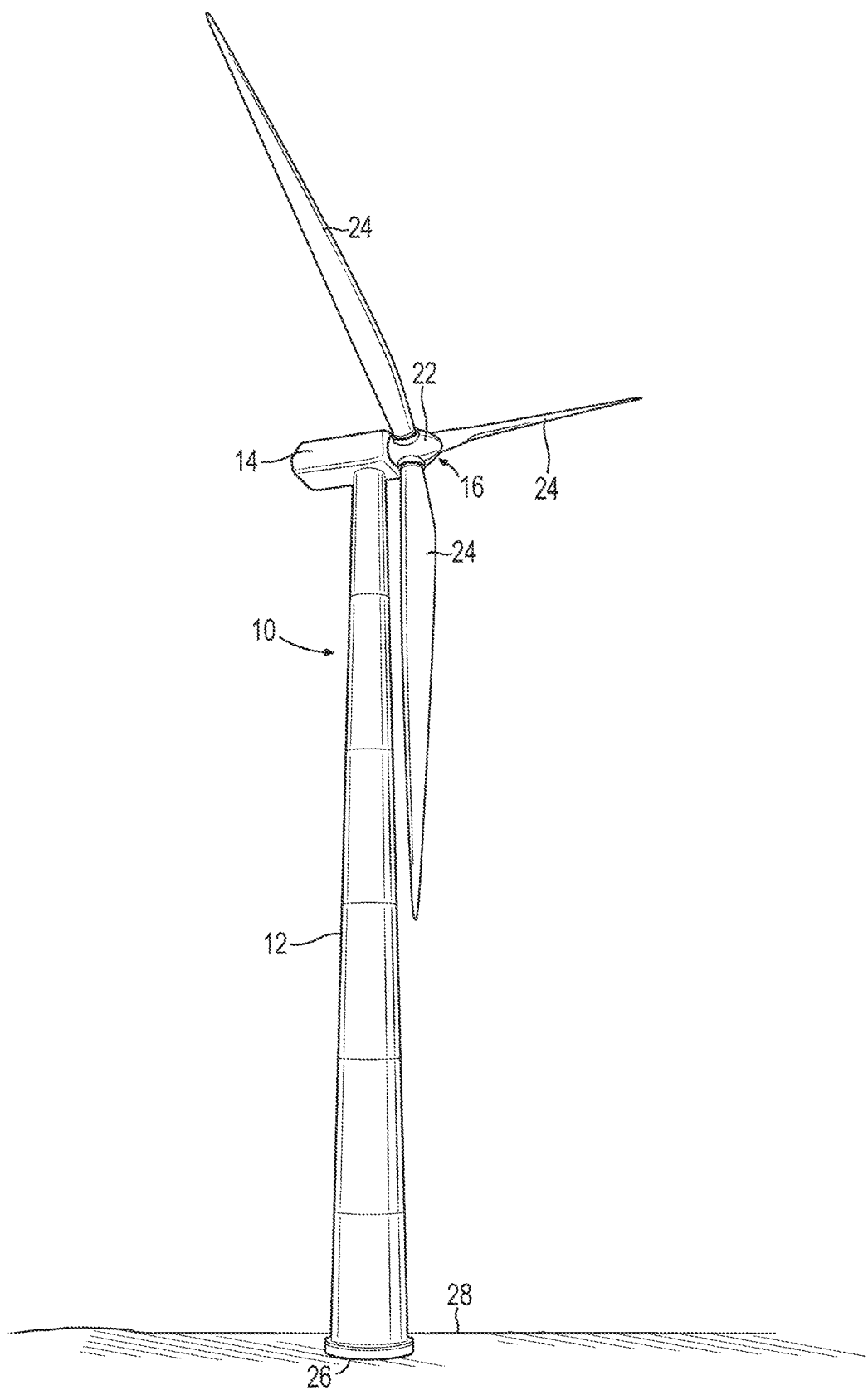
FIG. 1 is a perspective view of a wind turbine constructed in accordance with an illustrative embodiment of the invention.

Referring first to FIG. 1, a wind turbine 10 is shown and is constructed with a tower 12, a nacelle 14, and a rotor 16 coupled for rotation relative to the nacelle 14. The rotor 16 generally comprises a rotor hub 22 and three turbine blades 24 fixed for rotation with the rotor hub 22. As shown, the tower 12 includes a base 26 fixed to a support surface 28 which may, for example, be a foundation in the ground or any other suitable support surface including a platform at sea.

Figure 2:
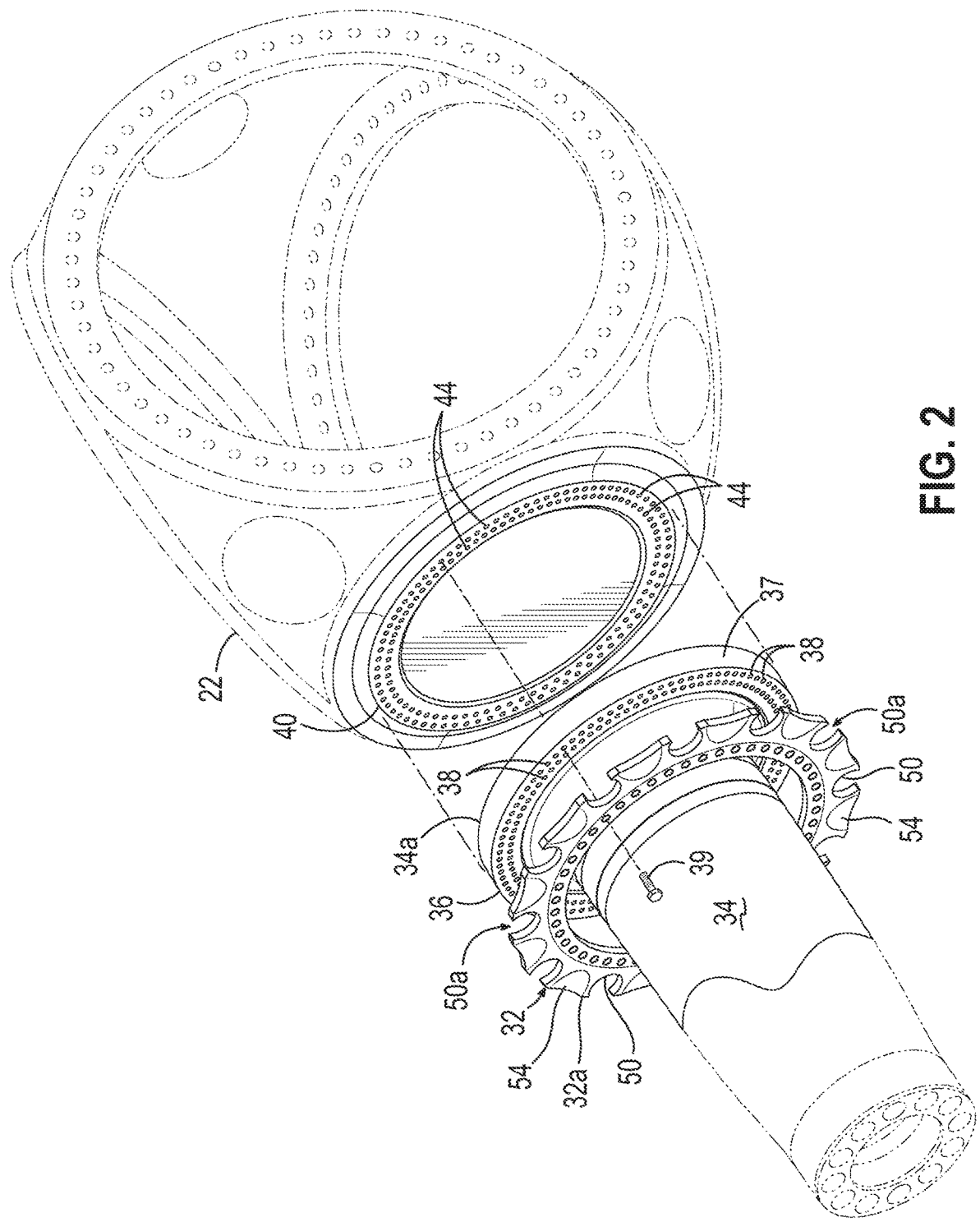
FIG. 2 is an enlarged perspective view showing illustrative connecting structures of the rotor hub and the main shaft in exploded form.
Figure 3:
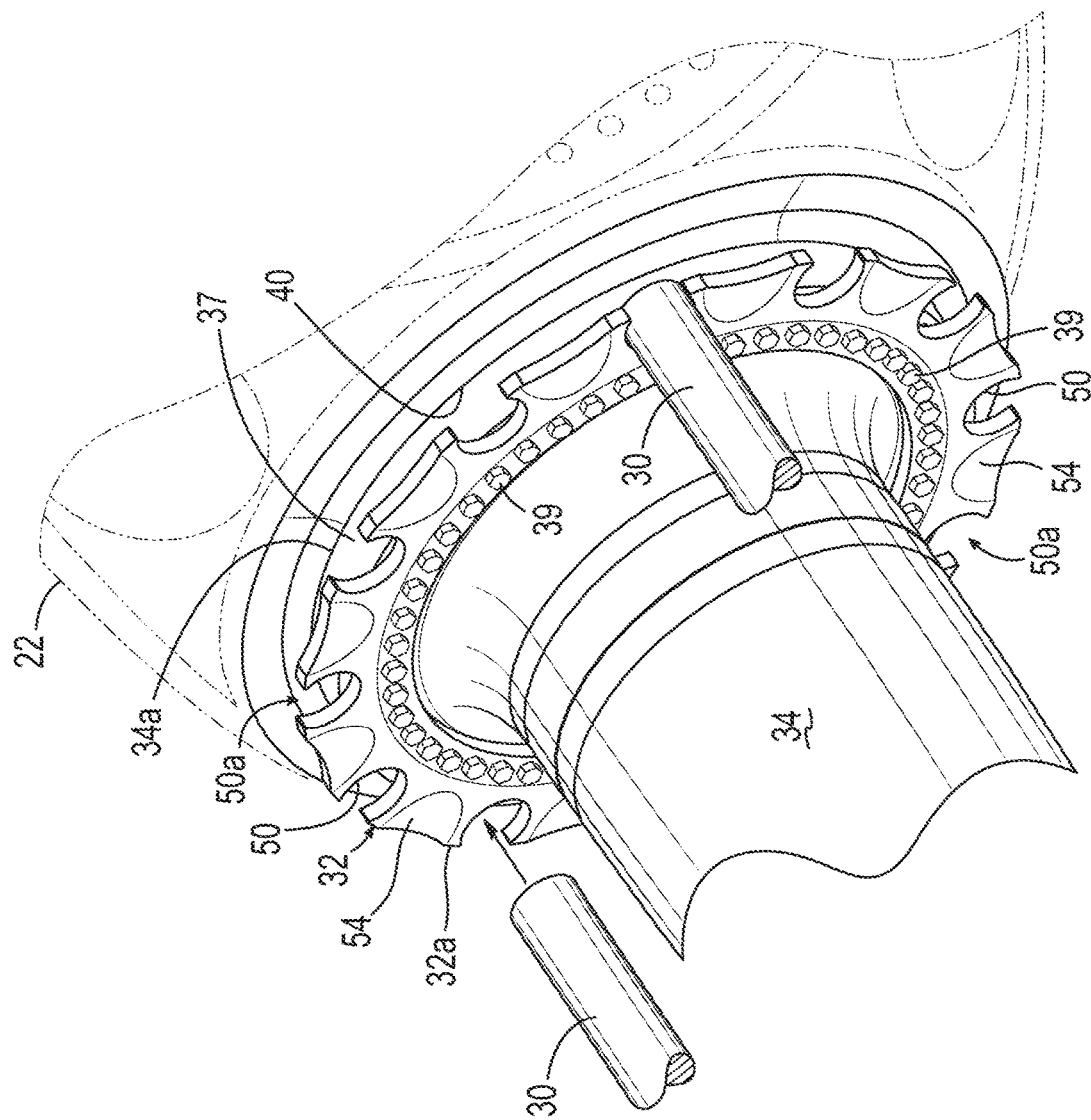
FIG. 3 is an assembled perspective view showing the main shaft connected to the rotor hub, and the engagement of rotor locking pins with the rotor locking disc.

Referring now to FIGS. 2 and 3, at times the rotor 16 must be fixed against any rotation. For example, these time periods may include maintenance periods or other times during which the wind turbine 10 is not in use. For this purpose, the wind turbine 10 includes a braking system and control (not shown) which will be used to slow and then stop the rotor 16 from rotating. The control will be used to activate a rotor lock system that comprises a plurality of rotor locking pins 30 engageable and disengageable with a rotor locking disc 32 as further described below. The wind turbine 10 generally includes a main shaft 34 which is coupled to a generator directly or through other drive components (not shown). The main shaft 34 further includes a front end 34a. The front end 34a includes a first connecting structure 36. This connecting structure 36 may comprise a flange 37 having a series of holes 38 for receiving threaded fasteners such as bolts 39. The rotor hub 22 includes a second connecting structure 40 configured to mate with the first connecting structure 36 on the front end 34a of the main shaft 34. These connecting structures 36, 40 are fixed rigidly together using at least one set or series of threaded bolts 39 extending through holes 38 in the flange 37 and into holes 44 provided in the rotor hub 22. As shown, the rotor locking disc 32 is carried on an area proximate the front end 34a of the main shaft 34. This may be accomplished in several different manners. For example, the disc 32 may be comprised of one or more separate components sandwiched or located between or adjacent the flange 37 and the connecting structure 40 of the rotor hub 22 and thereby rigidly affixed between these two components using the same bolts 39 as used to connect the flange 37 to the rotor hub 22. Alternatively, the rotor locking disc 32 may be integrated with an area proximate the front end 34a of the main shaft 34, such as by casting or otherwise forming the rotor locking disc 32 with the main shaft 34. One advantage of having the rotor locking disc 32 comprised of at least one separate component is that if the rotor locking system somehow damages the disc 32, the disc may be replaced and/or repaired without having to remove and replace the entire main shaft 34.

Figure 4:
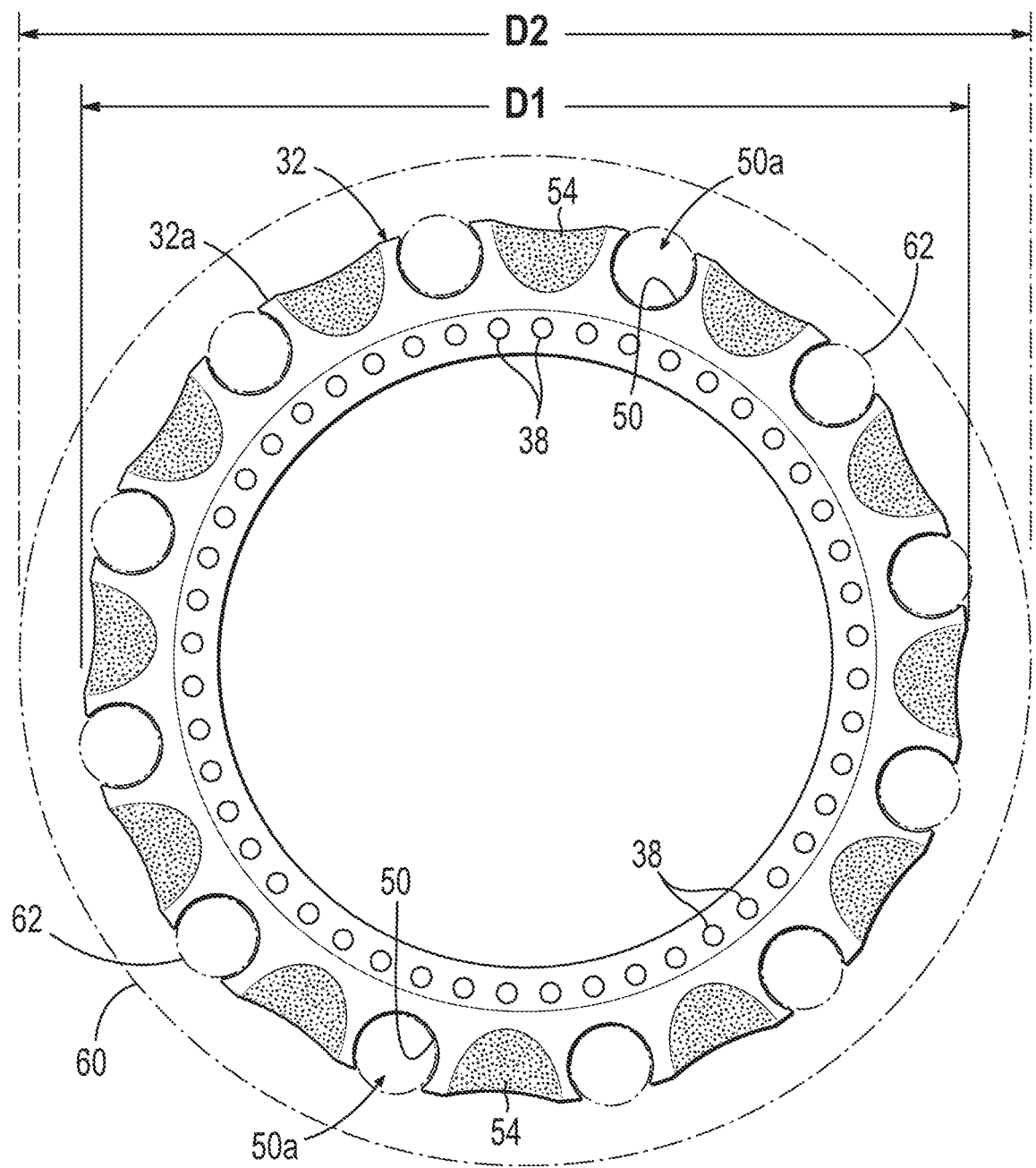
FIG. 4 is an elevation view schematically showing the relative size difference between a rotor locking disc of the present invention and a conventional rotor locking disc.

As further shown in FIGS. 2-4, the rotor locking disc 32 has an outer circumference 32a and a plurality of open perimeter recesses 50 in a face of the rotor locking disc 32. The recesses 50 have openings 50a communicating or intersecting with the outer circumference 32a. In other words, and unlike conventional closed perimeter recesses in axial locking systems, there is an area or opening 50a in which there is no disc material radially outward of the recess 50. At least one rotor locking pin 30 is movable in an axial direction parallel to the lengthwise axis of the main shaft 34. The pin 30 moves between a disengaged position relative to at least one of the recesses 50 and an engaged position at least partially located in one of the recesses 50 for locking the rotor hub 22 against rotation. The recesses 50 are shown as partially circular in shape and the pins 30 have a complementary cylindrical shape for closely extending at least partially into an aligned recess 50. Other shapes may be used instead, such as tapered shapes as will be described below, or other non-tapered shapes. The plurality of recesses 50 may further comprise from six to twenty recesses 50. The partially circular shaped recesses 50 may each be defined by an arc length of at least 200 degrees. By having more than 180 degrees it is secured that the pins cannot leave the recesses, and keeping it way lower than 360 degrees secures the benefits described herein. At least 200 degrees is therefore believed to be a good solution; however, in other embodiments, at least 220, at least 240 or at least 270 degrees could also be useful. Two rotor locking pins 30, for example, may be located at the three o'clock and nine o'clock positions relative to the disc 32 and may be driven along their respective axes by suitable drive components (not shown) between extended and retracted positions. In the extended position, the pins 30 will have their ends at least partially received in a respective aligned recess 50 thereby locking the rotor hub 22 and main shaft 34 against any rotation. For achieving this purpose, it will be appreciated that the pins 30 are part of a rotor locking system in the nacelle 14 (FIG. 1) that is rigidly secured and fixed in place with components that are not shown for the sake of conciseness. However, these components of the rotor locking system are well known to those of skill in the art. In the retracted position, the pins 30 will disengage the recesses 50 along the same axial path as the engagement movement previously described but in the opposite direction. This disengagement will unlock and allow rotation of the rotor hub 22 and main shaft 34.

The rotor locking disc 32 further includes reduced thickness areas 54 located between adjacent recesses 50. These reduced thickness areas 54, like the recesses 50, may be of any desired number and may be generally U-shaped. There may be more than one reduced thickness area 54 between adjacent recesses 50 and/or at one or more locations, there may not be any reduced thickness area 54 between adjacent recesses 50. The reduced thickness areas 54 provide a manner to reduce overall weight of the disc 32 while still optimizing strength and stress distribution characteristics necessary to accommodate the large forces between the disc 32 and the pins 50. As further shown in FIG. 4, the outer diameter D1 of the rotor locking disc 32 is smaller than the outer diameter D2 of a conventional rotor locking ring 60 having through holes 62 near the periphery for receiving rotor locking pins. This reduction in diameter further increases accessibility to the rotor hub 22 and reduces weight of the rotor locking disc 32 while enabling optimization of strength and stress characteristics, as well as allowing more design freedom for the shape and configuration of the disc 32. Further, more design freedom thereby exists for components near the rotor locking disc 32 in the nacelle 14 (FIG. 1), including the nacelle 14 itself, as the height/width of the rotor locking disc 32 will often be a larger part of the dimensions of the nacelle 14.

Figure 5:
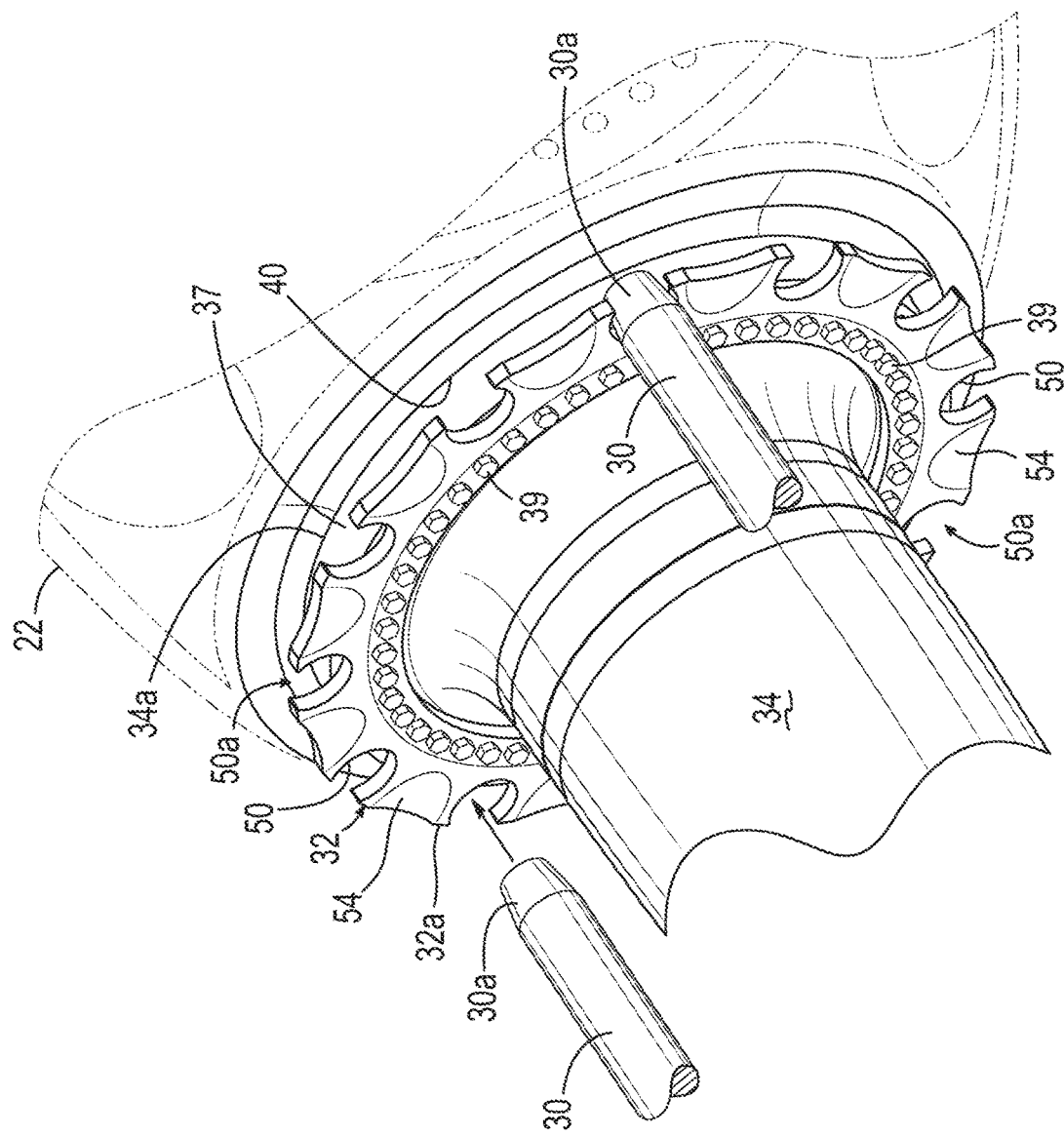
FIG. 5 is an assembled perspective view similar to FIG. 3, but illustrating tapered pins for selectively engaging tapered recesses of a rotor locking disc.

FIG. 5 illustrates an alternative embodiment of the rotor locking disc 32 and pins 30'. This embodiment may be constructed as described generally above in connection with the first embodiment, but may further include differences as shown and/or described with respect to FIG. 5. In this figure, the same reference numerals are used to describe common features or components with respect to the first embodiment and need no further detailed discussion. Features or components that are slightly different from analogous features or components of the first embodiment are denoted with the same reference numerals but also include prime (') marks. More specifically, FIG. 5 illustrates an alternative embodiment in which the recesses 50 may have a tapered shape along the lengthwise axes and axes of movement of the pins 30', and the pins 30' may have a complementary tapered shape at the tip portion 30a' (i.e., tapering to a smaller diameter in a direction toward the rotor hub 22). The tapered shapes may, for example, be at least partially conical as shown. By such tapered/conical shape an easier locking process may be facilitated as minor misalignments are acceptable and the pins can enter the respective holes anyway.

FIG. 6 illustrates another alternative embodiment generally as described regarding FIG. 5. This embodiment further illustrates closed perimeter recesses 50' as opposed to the open perimeter recesses 50 of the previous embodiments, but retains the advantageous feature of reduced thickness areas 54 as described above. It will be appreciated that the recesses 50' may instead be configured as open perimeter recesses with all of the advantages as previously described, with or without any tapering and in any desired shape or configuration.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine, comprising:
 a main shaft including a front end, the front end including a first connecting structure;
 a rotor hub including a second connecting structure, wherein the second connecting structure of the rotor hub is fixed to the first connecting structure of the main shaft;
 a plurality of blades coupled to the rotor hub;
 a rotor locking disc carried on the main shaft, the rotor locking disc having an outer circumference and a plurality of open perimeter recesses on the outer circumference, the recesses having respective openings intersecting with the outer circumference; and
 at least one rotor locking pin movable in an axial direction relative to the lengthwise axis of the main shaft between a disengaged position relative to at least one of the recesses and an engaged position wherein the pin is located at least partially in one of the recesses for locking the rotor hub against rotation.

2. The wind turbine of claim 1, wherein the plurality of recesses further comprises from six to twenty recesses.

3. The wind turbine of claim 1, wherein each of the plurality of recesses is partially circular in shape.

4. The wind turbine of claim 3, wherein the partially circular shaped recesses are each defined by an arc length of at least 200 degrees.

5. The wind turbine of claim 1, wherein each of the recesses and the rotor locking pin have complementary tapered shapes.

6. The wind turbine of claim 5, wherein the complementary tapered shapes are at least partially conical shapes.

7. The wind turbine of claim 1, wherein the rotor locking disc is integrated with an area proximate the front end of the main shaft.

8. The wind turbine of claim 1, wherein the rotor locking disc is comprised of at least one component separate from the main shaft and affixed to an area proximate the front end with a plurality of fasteners.

9. The wind turbine of claim 1, wherein the rotor locking disc further comprises a plurality of fastener holes for receiving the plurality of fasteners, wherein the plurality of fastener holes are located radially inward from the plurality of recesses.

10. The wind turbine of claim 1, wherein the rotor locking disc further comprises a plurality of reduced thickness areas located at a peripheral region of the disc.

11. The wind turbine of claim 10, wherein one or more of the reduced thickness areas is located between adjacent recesses.

12. The wind turbine of claim 10, wherein the reduced thickness areas are generally U-shaped.

13. The wind turbine of claim 1, wherein each of the plurality of recesses is generally U-shaped.

14. A wind turbine, comprising:
 a main shaft including a front end, the front end including a first connecting structure;
 a rotor hub including a second connecting structure, wherein the second connecting structure of the rotor hub is fixed to the first connecting structure of the main shaft;
 a plurality of blades coupled to the rotor hub;
 a rotor locking disc carried on the main shaft, the rotor locking disc having an outer circumference and a plurality of recesses;
 at least one rotor locking pin movable in an axial direction relative to the lengthwise axis of the main shaft between a disengaged position relative to at least one of the recesses and an engaged position wherein the pin is located at least partially in one of the recesses for locking the rotor hub against rotation; and
 a plurality of reduced thickness areas located at a peripheral region of the disc in areas between adjacent recesses.

* * * * *